June 9, 1953 S. W. SILVERSTEIN 2,641,161
CONTACT LENS
Filed Dec. 13, 1950 2 Sheets-Sheet 1

Samuel W. Silverstein
INVENTOR.

BY
Attorneys

June 9, 1953  S. W. SILVERSTEIN  2,641,161
CONTACT LENS
Filed Dec. 13, 1950  2 Sheets-Sheet 2
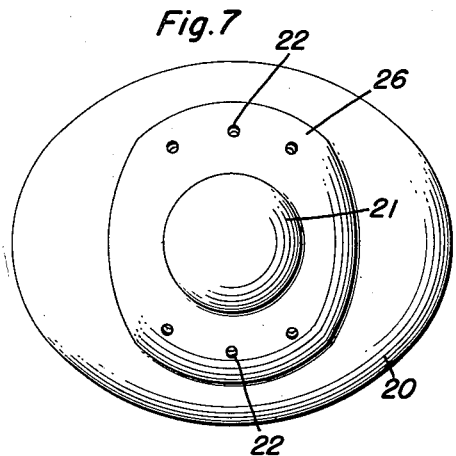
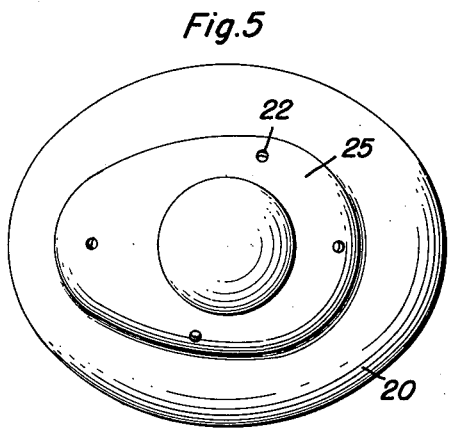
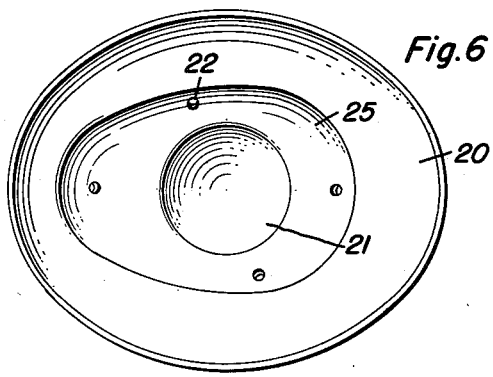
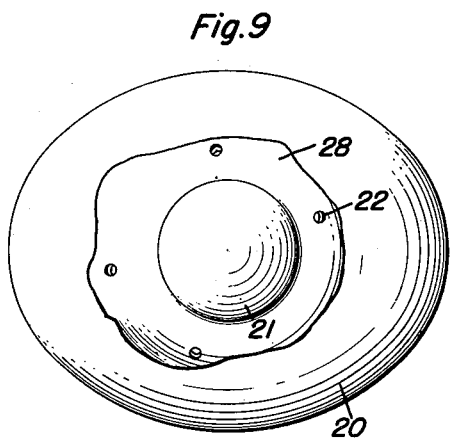
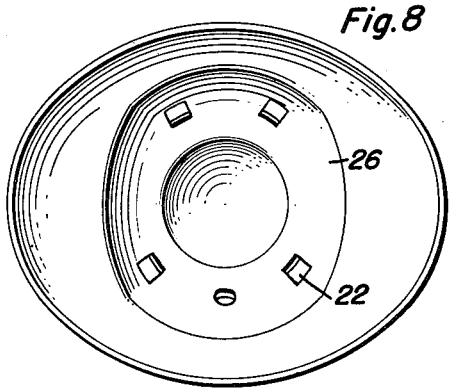
Samuel W. Silverstein
INVENTOR.

Patented June 9, 1953

2,641,161

UNITED STATES PATENT OFFICE 2,641,161

CONTACT LENS

Samuel W. Silverstein, Passaic, N. J.

Application December 13, 1950, Serial No. 200,530

3 Claims. (Cl. 88—54.5)

This invention relates to contact lenses adapted to be placed closely to the cornea of the eye for correcting a deficient vision, which lens either replaces the customary spectacle lenses or which corrects defects which cannot be corrected by spectacle lenses.

Two types of contact lenses are customarily used, one type using solutions introduced between the eye and the contact lens which solution also forms the fluid lens correcting the vision, and the other type being used without introducing such a solution. These types of contact lenses occur in many variations.

Both types of contact lenses have the disadvantage that they can be worn only for a relatively very short time on account of the discomfort which they cause to the eyes. With lenses using solutions, after a short period of wearing the lens halos around lights appear and the vision becomes cloudy on account of the infiltration of the solution into the corneal region of the eye. Types of lenses used without fluid are so constructed that a movement of the eye may accidentally touch the limbal region and such a contact, even if of a very fleeting and transitory nature, causes great pain and irritation.

The discomfort which is caused by the solutionless lenses is partly due to the fact that the free drainage of the normal lacrimal secretion is interfered with.

The invention relates to the first-named type of contct lenses and it has for its main object to provide a contact lens in which the disadvantages connected with the solutionless lenses are greatly reduced or eliminated. According to the invention the contact lens consists of three sections, one section being a central corneal section, a further section being a marginal scleral section and the third section being a transitional section arranged between the two aforesaid sections, said three sections being so arranged and fitted to the eye of the wearer that the corneal section is smaller than the cornea and leaves an outer annular marginal portion of the cornea uncovered, while the scleral portion likewise leaves an inner annular scleral portion uncovered. The transitional section, however, not only covers the limbal region of the eye, located between the cornea and the sclera but also covers the outer corneal and the inner scleral portions which have not been covered by the aforesaid two sections of the lens.

Furthermore, according to the invention the curvature of the surface of the inside of the contact lens is such that the scleral section of the lens is so curved that it fits a portion of the sclera of the eye or that it is tangential thereto, while the inner surface of the corneal section is so ground and shaped that together with the cornea it determines the shape of a meniscus formed by the lacrimal fluid which is maintained between the cornea and the lens by capillary action. This lens may be either a meniscus or toric. The transitional or limbal section of the lens is provided with a curved surface, the curvature of which may vary but which has an average radius of curvature which is larger than that of the eye so that a pocket is formed between the said transitional section of the lens and the limbal region of the eye. Moreover, according to the invention the said transitional section of the lens is provided with bores, holes or channels through which the lacrimal fluid may circulate, the pockets which are formed being, however, so large that they are not filled with said fluid but are partly filled with air bubbles which serve to oxygenate the tissues and which otherwise further the nutritional metabolic processes in this region.

The contact lens thus causes much less irritation and discomfort to the eye and may be worn for a relatively long period without causing disturbances in the vision.

The invention is illustrated in the accompanying drawings showing one modification thereof and further showing the way in which lenses which have to be fitted individually to the eye of the wearer have to be modified in order to suit the different conditions. It will therefore be clear, on account of the fact that the lens has to be adjusted and fitted individually that the drawings cannot illustrate and the specification cannot describe all the various cases of adjustment. The embodiment which has been illustrated in detail therefore serves the purpose of explaining the principle of the invention and the best mode of applying the principle. However, a departure from the embodiment which has been shown in the drawings does not necessarily constitute a departure from the principle of the invention for the reasons above stated.

In the drawings:

Figures 5 and 6 are elevational front and rear views of a contact lens which has been fitted to the eye of a wearer having a limbal region the width of which differs when measured in different directions;

Figure 7 is an elevational front view of a lens fitted to the eye of a wearer with a limbal region of the eye which is wider in a vertical than in a horizontal direction;

Figure 8 illustrates a contact lens in elevational rear view which is similar to the lens illustrated in Figure 7 but which is provided with channels for the lacrimal fluid the direction of which is inclined towards a line perpendicular to the surface into which they are bored; and Figure 9 is an elevational front view of a contact lens in which the transitional region has an irregular contour.

As above described the characteristic feature of the contact lens according to the invention consists in the fact that the lens has three sections or segments, one of said sections or segments being a corneal segment having a size which is smaller than the size of the cornea and whose radius of curvature differs from that of the cornea, a further section or segment being a scleral section or segment which extends over a portion of the scleral zone of the eye which is somewhat removed from the limbal region of the eye and whose curvature is approximately equal to that of the region of the eye on which it rests or is tangential thereto and the third section being a transitional or limbal section or segment which is somewhat larger than the limbal region of the eye and which therefore not only covers this region but also covers strips of the adjacent corneal and scleral regions as well. This segment or section has a radius of curvature which may vary but which in any case differs from and is usually larger than the radius of curvature of the region of the eye which is covered by the said section or segment. Moreover, this section or segment is also provided with channels, apertures or holes which permit the free flow of tears through said holes.

The location of these channels, apertures or holes is an important point as they must be so located that the free flow of the tears to the corneal portion immediately adjacent to the limbus to the limbus itself and also the scleral portion is secured.

Figure 1:
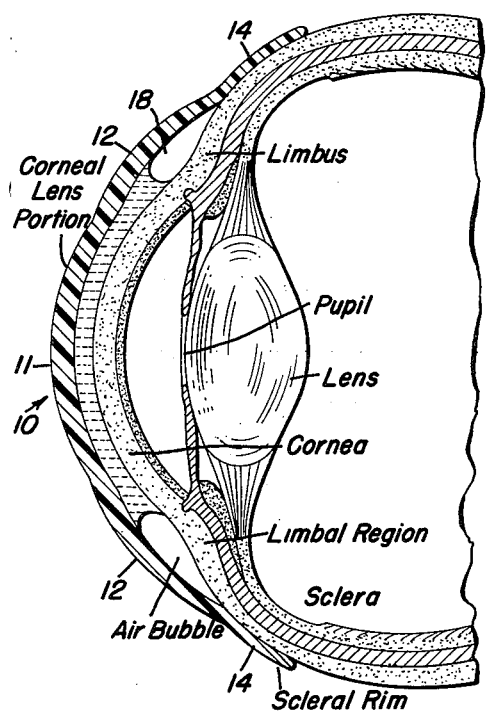
Figure 1 is an elevational cross sectional view through the front part of a human eye to which a lens according to the present invention has been fitted, the section being taken along the vertical median plane bisecting the eye.

As will be seen from the drawings and especially from Figure 1 showing a cross section through the front portion of a human eye with the various regions clearly marked in the drawings the contact lens comprises the corneal section or segment 11, the transitional section or segment 12 and the scleral section or segment 14. As the drawing has been provided with explanatory inscriptions it is believed that the regions of the human eye need not be described further.

The corneal section of said contact lens must be so ground and so positioned that its inner surface is close to the cornea and that its radius of curvature differs from the radius of curvature of the cornea to such an extent that a fluid lens is formed by the lacrimal fluid which is retained by capillary action between the cornea and the contact lens and which is just of the right curvature to correct the deficiency of vision for which the lens has been designed.

It will be observed that the section 11 is not coextensive with the cornea but is smaller than the same and that it is much larger than the pupil. Therefore, an annular portion of the cornea near the outer region of the same is not covered by the said section 11 of the contact lens. This section is covered by the annular transitional section 12. This latter annular section is wider than the limbal region and therefore covers not only the annular corneal region immediately adjacent to the limbal region but also covers the annular scleral region adjacent to the limbal region on the other side. Its curvature is clearly different from that of the eye in this region and preferably the radius of curvature is larger than the radius of curvature of the eye in the region covered by it. This surface must not be formed in such a way that the radius of curvature is constant but in accordance with circumstances this surface may have different curvatures which may be joined if necessary by straight sections.

The limbal or transitional section or segment 12 of the contact lens is also provided with channels, openings or holes 15 (Figures 2, 3 and 4) which may either be so arranged that they are perpendicular to the surface of the contact lens at the point at which they pierce the same or, preferably, they may be so arranged that they direct the lacrimal fluid to the point where the meniscus is formed or they are so directed that they discharge the fluid coming from said meniscus.

Figure 2:
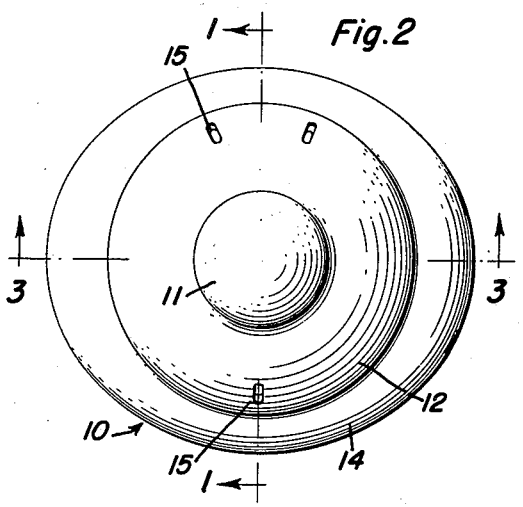
Figure 2 is an elevational front view of the lens.
Figure 4:
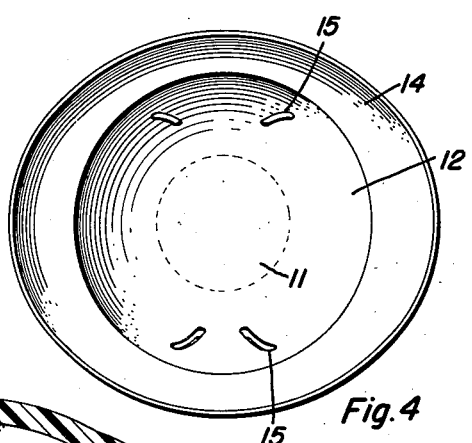
Figure 4 is an elevational rear view of the lens looking towards the inside which is closest to the surface of the eye.
Figure 3:
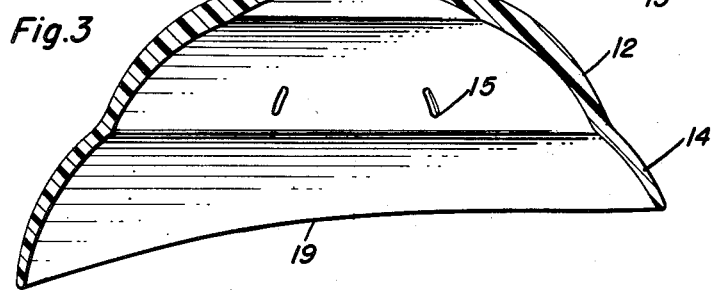
Figure 3 is a cross sectional view through the contact lens the cross section being taken along the line 3—3 of Figure 2.

These channels or openings 15 may be arranged anywhere in the annular zone 12 but on account of the position of the lacrimal glands and in order to obtain the best circulation of the fluid it is of advantage to arrange some of them near or in the vertical axis of symmetry as indicated in Figure 2. As seen in Figures 3 and 4 they preferably form inwardly directed channels directing the fluid towards the central portion or from the central portion which is covered by the section 11 of the lens.

The outermost or scleral section 14 of the contact lens has a curvature which is approximately equal to the curvature of the scleral portion of the eye so that this section or segment lies flat on the section of the eye along an annular zone. However, this section may be bordered by curves which are different in the different sections or quadrants and moreover the width of the zone may vary in different regions of the eye. Instead of being curved so as to conform itself to the shape of the eye this section may be so curved or shaped that it is tangential to the scleral portion of the eye.

As will be observed from Figure 1 the contact lens therefore is only in contact with the eye along the scleral portion but otherwise is not in contact with the eye and in the limbal region pockets 18 are formed surrounding the fluid lens meniscus.

Through these pockets a direct flow of the lacrimal fluid takes place. As the fluid does not fill the pockets air bubbles are constantly present in these pockets. These air bubbles permit a constant oxygenation and also a nutrition and a general metabolism of the limbal area and of the adjacent corneal and scleral portions of the eye. This circulation together with the air pockets form one of the main factors eliminating the irritation and they contribute to the lengthening of the period during which the lens may be worn without discomfort.

It will be noted that the lens must be accurately fitted over the eye in the corneal portion to produce the fluid meniscus between the cornea and the inner lens surface and it will likewise be noted that the contact lens must be fitted on the scleral section in order to leave free a portion of the scleral section adjacent to the limbal region and in order to fit an annular region beyond the aforesaid region. Over the limbal region no fitting is necessary except that the width of this region must be fitted so as to be in accordance with the configuration of the limbal region of the eye of the wearer. The properly constructed corneal and intermediate sections of the lens according to the invention may be joined to a scleral section which is the result of a molding of that section in conformity with the shape of the eye obtained in a manner well known in itself.

It will also be noted that the periphery of the scleral section 14 must be constructed in accordance with the shape of the eye and therefore may follow a curve which is different in character in the different quadrants. Moreover, it will also be noted that the character of this curve differs from that of the corneal portion. For instance, in the example shown in Figures 2-4 the periphery of the scleral portion is shown to be substantially elliptic while the corneal portion is approximately circular. Moreover, the edge of the scleral section 14 is preferably not in a plane but is curved along a surface (indicated in Figure 3 at 19) which permits a greater width of the scleral portion in those parts in which contact along a larger surface is permissible without irritation.

With the holes or channels 15 arranged as shown, a steady flow of the lacrimal fluid is secured but an additional advantage is also obtained by the fact that the positions in which the holes are arranged are covered by the lids so that a cosmetically advantageous appearance is obtained.

On account of the conditions above described the fitting of the contact lens and especially the correct fitting of the corneal portion or section is a decisive factor. Likewise, it is of the greatest importance to place the limbal section or segment of the contact lens not only over the limbal region but in such a position that it covers partly the outer corneal region and partly the inner scleral region of the eye. Therefore, on account of the difference between individuals it is not only necessary to determine correctly the dimensions of the three sections but it is also necessary to give to the scleral region of the lens as well as to the transitional region a special shape in order to fit the lens to the individual case. Examples of this type of fittings are shown in Figures 5 to 9 which examples also show different ways of arranging the holes or channels. These examples do not show what may be termed modifications of the lens but show merely the way in which the lenses have to be fitted to the individual which is wearing them.

In Figures 5 and 6 an example is shown in which the scleral portion 20 is somewhat elongated and is approximately elliptical while the corneal portion 21 is approximately circular, the limbal region of the eye being in this case also elongated. This results in the transitional section 25 having a contour line of ovoid shape and in this case the transitional section or segment is of greater width on one side of the corneal section than on the other side of the said section. It will also be understood that in some cases the shape of the scleral portion is not elliptical but is a composite shape showing different curves in the different quadrants.

In the example shown in Figures 5 and 6 round holes 22 are provided for the circulation of the lacrimal fluid which are more or less evenly distributed and are arranged substantially in or near the horizontal and the vertical plane.

Figure 7 shows the case of a lens which has to be fitted to an eye in which the limbal region is smaller in the horizontal direction than it is in the vertical direction. The transitional segment or section in this case has a contour which consists essentially of curves joined to form a kind of quadrilateral 26. The openings for the lacrimal fluid are again circular and are in this case six in number.

A similar case is shown in Figure 8 illustrating the contact lens when viewed from the inside, the bores or holes 22 in the transitional segment or section being in this case channels running in a direction which deviates from the perpendicular to the surface into which they have been bored. Moreover, they are inwardly directed so as to discharge the fluid radially with respect to the center of the cornea.

Finally, in Figure 9 a limbal or transitional section or segment 28 of irregular contour is shown which fits an eye with an irregular shape of the limbal region. Again the bores or channels 22 are shown as being round and are more or less evenly distributed around the limbal region.

Other shapes are possible and it is especially preferable in some cases to make the limbal or transitional section or segment in such a manner that in cross section it is not shaped along a single curve of a definite radius of curvature but that it is composed of a plurality of curves joined to each other or joined by straight lines. It will be noted that the shape of the limbal section or segment in all these examples is different in the different quadrants and it may be added that the shape of the scleral portion may also be different in the different quadrants in order to suit individual cases.

It will be clear to the expert skilled in this art that the invention may be modified also in other manners and that a departure in unessential points will not in any way effect the scope of the invention as defined in the adjoined claims.

Having described the invention, what is claimed as new is:

1. A contact lens comprising a corneal section of the lens covering a portion of the cornea of the eye and spaced therefrom so as to retain lacrimal fluid between it and the cornea by capillary action, said corneal section being larger than the pupil but smaller in size than the cornea, thus leaving a marginal annular portion of the cornea uncovered, a scleral section of the lens covering a portion of the sclera but leaving an inner substantially annular portion of the sclera uncovered, said scleral section being curved and shaped for contact with the sclera along a limited portion of the same, an intermediate section between said corneal and scleral sections, covering the limbal region of the eye and the adjacent substantially annular corneal and scleral portions, said intermediate section having a curvature of a smaller radius of curvature than the adjacent sections of the eye, so as to produce an enlarged annular space between the contact lens and the eye forming a pocket, bulging outwardly from the eye around the corneal section, the zone of transition joining said intermediate section and the scleral section having a contour shaped in accordance with the shape of the limbal region of the eye, and channels piercing said outwardly bulging intermediate zone for conducting the lacrimal fluid produced on the outside of the contact lens into the pockets on the inside, said pockets being thus filled partly with air and partly by the lacrimal fluid.

2. A contact lens as claimed in claim 1 wherein the curved cross section of the intermediate section has a curvature which is composed of different curves joining each other so as to form a curved line with varying radius of curvature, the resulting combined curve producing the aforesaid outwardly bulging annular section surrounding the corneal section.

3. A contact lens comprising a corneal lens section having an inner surface spaced from the cornea and ground so as to form the outer surface of a fluid meniscus held between the corneal section and the cornea by capillary attraction and adapted to correct a deficiency of vision, said corneal section being larger than the pupil, but smaller than the cornea, so as to leave an outer marginal portion of the cornea uncovered, an intermediary lens section covering the outer marginal portion of the cornea, the limbal region of the eye and the inner marginal portion of the sclera of the eye adjacent to the limbal region, said intermediate section being curved outwardly with an average radius of curvature smaller than the radius of curvature of the region of the eye which is covered, thus forming an outwardly bulging annular pocket of a size wider than the distance between the corneal lens section and cornea around the fluid meniscus held between the corneal lens section in contact with the sclera and cornea, and a scleral lens section covering a portion of the sclera located around the aforementioned inner marginal portion of the sclera, and having a curvature approximately equal to that of the eye, the contour of the junction line between the scleral lens portion and the outwardly bulging intermediary lens section following approximately the shape of the limbal region of the eye, and channels leading from the outside into the annular outwardly bulging pocket, in order to obtain a free circulation of the lacrimal fluid over the limbal region and through an air filled space over the cornea.

SAMUEL W. SILVERSTEIN.

References Cited in the file of this patent

UNITED STATES PATENTS

| Number | Name | Date |
|---|---|---|
| 1,921,972 | Fertsch et al. | Aug. 8, 1933 |
| 1,929,228 | Wilhelm | Oct. 3, 1933 |
| 2,129,305 | Feinbloom | Sept. 6, 1938 |
| 2,253,497 | Kollmorgen | Aug. 26, 1941 |
| 2,393,266 | Riddell | Jan. 22, 1946 |

FOREIGN PATENTS

| Number | Country | Date |
|---|---|---|
| 908,133 | France | Aug. 20, 1945 |
| 926,463 | France | Apr. 21, 1947 |
| 592,055 | Great Britain | Sept. 5, 1947 |

OTHER REFERENCES

Bulletin From Precision Contacts Inc., vol. 1, #10, 1947, page 2. Copy in Division 7.